Aug. 16, 1949.   W. C. SUTPHIN   2,479,029
SUPERHEATER FOR CAR HEATERS
Filed Feb. 17, 1947   2 Sheets-Sheet 1
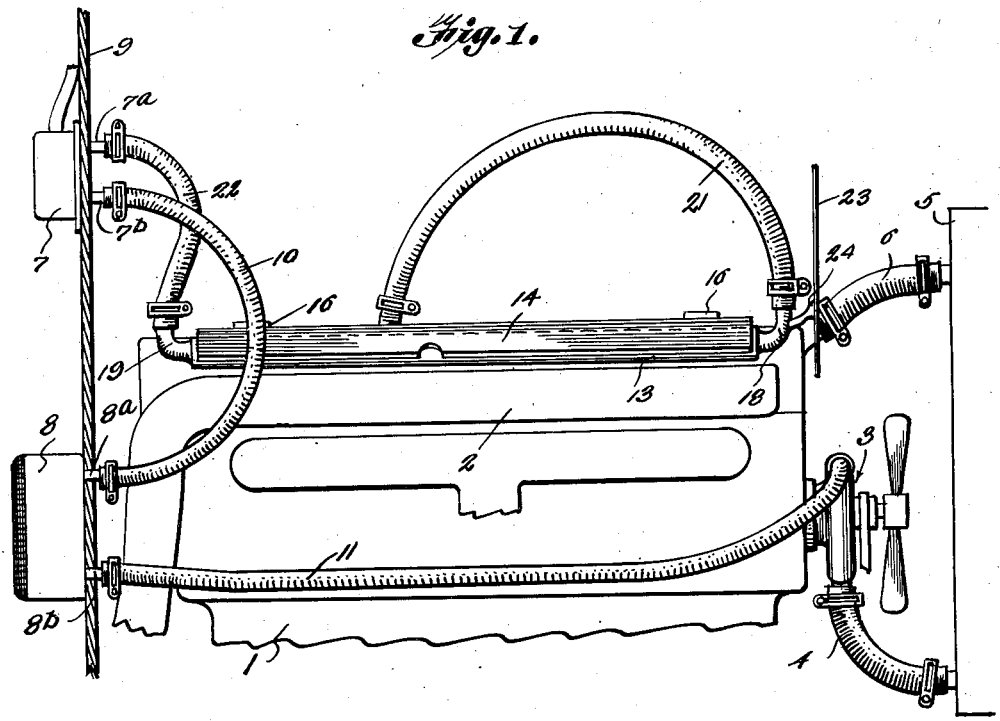
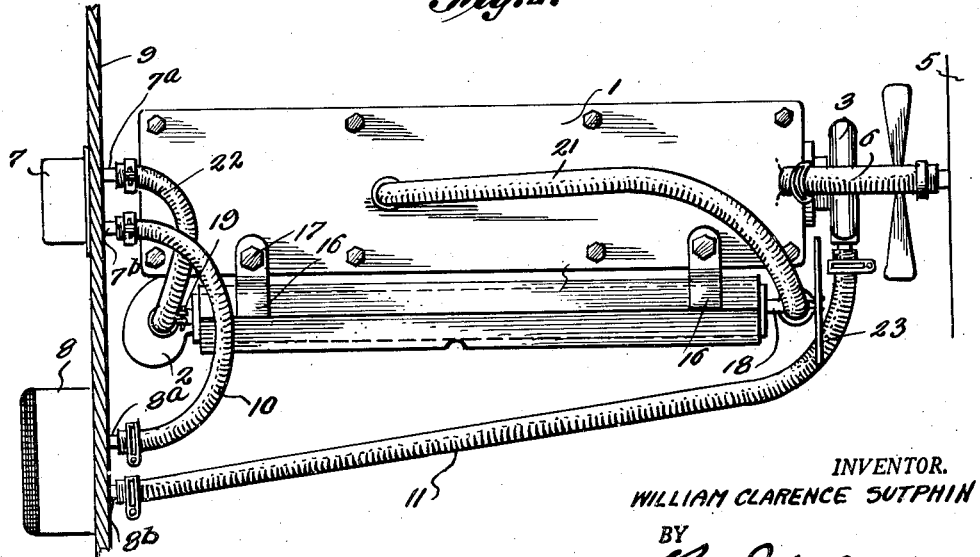
INVENTOR.
WILLIAM CLARENCE SUTPHIN
BY
ATTORNEY

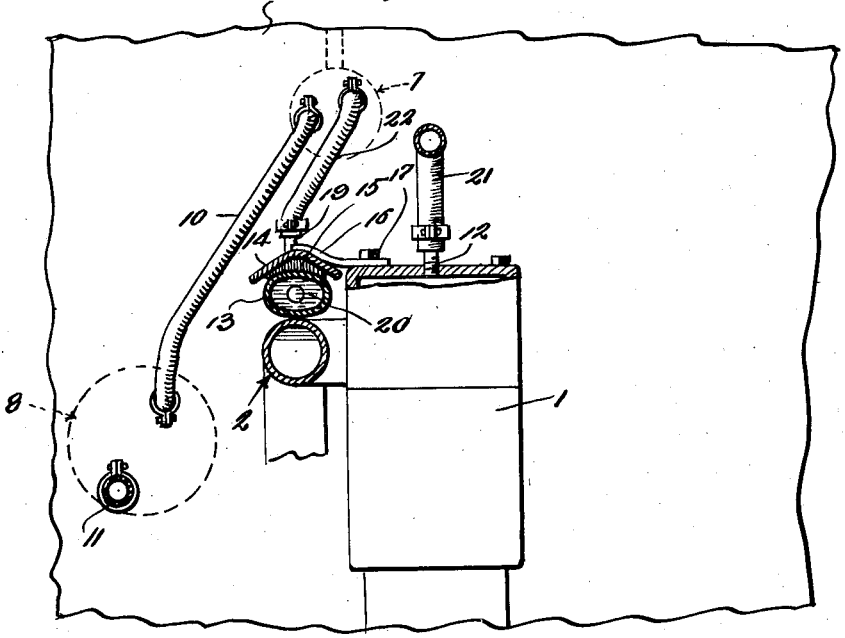
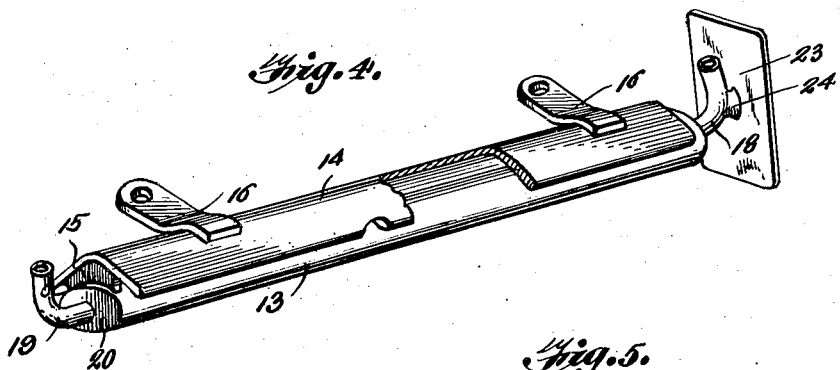
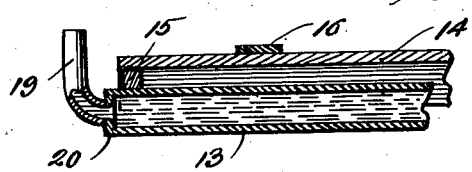

Patented Aug. 16, 1949

2,479,029

UNITED STATES PATENT OFFICE 2,479,029

SUPERHEATER FOR CAR HEATERS

William Clarence Sutphin, Lebanon, Ind.

Application February 17, 1947, Serial No. 729,018

3 Claims. (Cl. 257—241)

This invention relates to a superheater for an automobile heater and it is one object of the invention to provide a superheater which may be installed in a hose line of an automobile heater and be mounted along the exhaust manifold so that as water of the cooling system flows through the superheater its temperature will be raised to such a point that it will serve very effectively to heat the coil of the automobile heater and thus cause air flowing through the automobile heater to be raised to a higher temperature than is the case when water flows from the water jacket of an engine to the car heater without absorbing extra heat from the hot exhaust manifold.

Another object of the invention is to provide a superheater of such construction that it may be disposed longitudinally of the exhaust manifold of an engine and held in place by bolts which serve to secure the head block of the engine to the cylinder block.

Another object of the invention is to provide a superheater which is simple in construction and may be easily installed as an accessory to a car heater of conventional formation.

The invention is illustrated in the accompanying drawings wherein:

Fig. 1 is a side view showing the improved superheater installed in position for use.

Fig. 2 is a top plan view of the structure shown in Figure 1.

Fig. 3 is a sectional view taken vertically through Figure 1.

Fig. 4 is a perspective view of the superheater.

Fig. 5 is a fragmentary sectional view taken longitudinally through the superheater.

The engine which is indicated in general by the numeral 1 represents an automobile engine of conventional construction and includes the usual exhaust manifold 2 and water pump 3 by means of which water or other coolant is drawn through the hose 4 from the radiator 5 and forced into the water jacket of the engine from which it flows through the hose 6 into the upper portion of the radiator where it flows downwardly and is cooled before again passing through hose 4 to the pump for recirculation.

The defroster 7 and the car heater 8 are of conventional construction and have their inlet pipes 7a and 8a and outlet pipes 7b and 8b mounted through the bulkhead 9 in the usual manner. The outlet pipe 7b of the defroster is connected with the inlet pipe 8a of the car heater by a hose 10 and a hose 11 connects the outlet pipe 8b of the heater with a nipple screwed into a normally plugged opening formed through the peripheral wall of the pump 3. Ordinarily the inlet 7a of the defroster is directly connected with an outlet pipe or nipple 12 screwed into an opening formed through the top of the head block of the engine by a hose so that hot water under pressure in the water jacket of the engine may flow from the water jacket to the defroster and heat the coils of the defroster and the car heater as it flows through them and returns to the lower portion of the water jacket by way of the hose 11 and the pump 3.

It has been found that often the temperature of the water is not sufficiently high to heat the defroster and the car heater to a desired temperature and in order to raise the temperature of the water delivered from the engine to the defroster I employ a superheater consisting of a tube or pipe 13 which is oval transversely in cross section and of such length that it extends substantially the full length of the head block of the engine. This superheater or pipe is disposed over the exhaust manifold and over it is disposed a metal shield 14 which extends its full length and has diagonally disposed side portions extending downwardly in diverging relation to each other, as shown in Figure 3. Welded webs 15 connect end portions of the shield with the pipe and welds may also be provided at other points intermediate the length of the shield if so desired. Brackets 16 formed from short strips of stiff metal are welded to the shield and extend transversely thereof, the brackets being of such length that they project from the inner side edge of the shield in position for resting upon the head block, where they are secured by certain of the screws 17 which secure the head block to the cylinder block of the engine. Short necks or nipples 18 and 19 extends from heads 20 at ends of the superheater, and these necks are curved to extend upwardly and project upwardly from the superheater a sufficient distance to allow hoses 21 and 22 to be secured about them. The hose pipe 21 extends rearwardly from the neck 18 and has its rear end secured about the nipple 12 and the hose 22 extends upwardly and rearwardly from the neck 19 and is secured about the inlet neck 7a of the defroster 7. Therefore hot water may flow from the water jacket of the engine through the nose 21 and enter the superheater through the neck 18 and flow through the superheater to the hose 22 which conducts it to the inlet of the defroster. As the water flows through the superheater which is heated by heat radiating from the exhaust manifold the temperature of the water will be raised and as this superheated water flows through the defroster and the car heater air passing through them will be heated to such a temperature that ice and snow will be prevented from accumulating upon the front wind shield and the car will be well heated. The shield 14 serves to retard upward movement of heat waves about the superheater and assists in causing rapid heating of the superheater. A metal plate 23 is connected with the neck 18 by an arm 24 and since this plate is disposed vertically at the front of the superheater and is of appreciably greater width than the superheater it will serve to deflect air flowing through the radiator 5 away from the front end of the superheater and the superheater will not be cooled by air flowing rearwardly along the engine.

Having thus described the invention, what is claimed is:

1. A superheater for heating water prior to delivery thereof from the water jacket of an engine to a heating unit for an automobile, said superheater comprising a tubular body of a length adapting it to extend along a side of the head block of an engine for the major portion of the length thereof in close proximity to the exhaust manifold of the engine, necks extending from front and rear ends of said body and upwardly for connection with the water jacket of the engine and the inlet of a heating unit of an automobile, a shield over said body extending longitudinally thereof for its full length and having side portions extending at a downward incline in opposite directions and projecting from opposite sides of the body, brackets carried by said shield and extending transversely thereof with portions projecting from the inner side edge of the shield and adapted to be secured to the head block of an engine, a deflector plate disposed vertically in front of the front neck and being of appreciably greater width and height than the body and projecting above and below and beyond opposite sides of the body, and an arm extending rearwardly from the plate and attached to the upwardly projecting portion of the front neck to support the said plate.

2. A superheater for heating water prior to delivery thereof from the water jacket of an engine to a heating unit for an automobile, said superheater comprising a tubular body of a length adapting it to extend along a side of the head block of an engine for the major portion of the length thereof and resting upon the upper portion of the exhaust manifold of the engine, necks extending from front and rear ends of said body and upwardly therefrom for connection with the water jacket of the engine and the inlet of a heating unit of an automobile, a shield over said body consisting of a plate of substantially inverted V-shape extending longitudinally of the body for substantially the full length thereof and projecting from opposite sides of the body, brackets carried by said shield and projecting laterally from the inner side edge of the shield for attachment to an engine.

3. A superheater for heating water prior to delivery thereof from the water jacket of an engine to a heating unit for an automobile, said superheater comprising a tubular body of a length adapting it to extend along a side of the head block of an engine in horizontal position over the exhaust manifold of the engine for the major portion of the length thereof, said body being oval in transverse cross section with its longest diameter extending horizontally, necks extending from front and rear ends of said body for connection with the water jacket of the engine and the inlet of a heating unit of an automobile, a shield over said body of inverted V-shape in cross section, said shield extending longitudinally of the body and welded to the upper surface of the body, and brackets carried by the shield for supporting the body and the shield along the exhaust manifold.

WILLIAM CLARENCE SUTPHIN.

REFERENCES CITED

The following references are of record in the file of this patent:

UNITED STATES PATENTS

| Number | Name | Date |
|--------|------|------|
| 1,809,528 | Patten | June 9, 1931 |
| 1,825,824 | Ryder | Oct. 6, 1931 |
| 1,837,647 | Bates | Dec. 22, 1931 |
| 1,966,522 | Roggenbauer | July 17, 1934 |
| 2,048,882 | Mullen | July 28, 1926 |

FOREIGN PATENTS

| Number | Country | Date |
|--------|---------|------|
| 418,636 | Great Britain | Oct. 29, 1934 |